(12) United States Patent
Storz

(10) Patent No.: US 7,336,571 B2
(45) Date of Patent: Feb. 26, 2008

(54) METHOD AND ARRANGEMENT FOR COMPENSATING SCANNING DISTURBANCES ON OPTICAL RECORDING MEDIA

(75) Inventor: Dieter Storz, Lauterbach (DE)

(73) Assignee: Thomson Licensing, Boulogne Billancourt (FR)

( * ) Notice: Subject to any disclaimer, the term of this patent is extended or adjusted under 35 U.S.C. 154(b) by 651 days.

(21) Appl. No.: 10/780,249

(22) Filed: Feb. 17, 2004

(65) Prior Publication Data

US 2004/0160865 A1 Aug. 19, 2004

(30) Foreign Application Priority Data

Feb. 18, 2003 (DE) ............................. 103 06 894

(51) Int. Cl.
*G11B 7/00* (2006.01)
(52) U.S. Cl. ................................. 369/44.32
(58) Field of Classification Search ............... None
See application file for complete search history.

(56) References Cited

U.S. PATENT DOCUMENTS

| 5,166,842 A | 11/1992 | Albert et al. | 360/77.04 |
| 5,550,685 A | 8/1996 | Drouin | 360/77.08 |
| 5,671,209 A * | 9/1997 | Kamioka et al. | 369/44.37 |
| 6,147,467 A | 11/2000 | Yu et al. | 318/561 |
| 6,163,429 A | 12/2000 | Tousain et al. | 360/77.04 |
| 6,628,576 B1 * | 9/2003 | Watanabe et al. | 369/30.17 |

FOREIGN PATENT DOCUMENTS

EP 1 003 159 5/2000

* cited by examiner

*Primary Examiner*—Wayne Young
*Assistant Examiner*—Adam R. Giesy
(74) *Attorney, Agent, or Firm*—Joseph J. Laks; Harvey Fried; Patricia Verlangieri

(57) ABSTRACT

The invention relates to a method and an arrangement for compensating scanning disturbances on optical recording media such as occur in a control loop of a playback or recording unit, in particular as settling amplitude after a disk disturbance and are caused by scratches or dirt on the optical recording medium. In order to compensate the scanning disturbances, a follow-up signal counteracting the settling amplitude is coupled into the control loop as additional offset as a function of the frequency of the occurrence of a disk disturbance for a prescribed time interval. The follow-up signal is coupled into the control loop with a step width that is increased from revolution to revolution on the recording medium until the change in the direction of the settling amplitude of the control loop. Large follow-up signal values are produced in a stepwise fashion in the event of absence of the disk disturbance, in order to avoid large variations in the follow-up signal value. The duration of one revolution of the recording medium, or a shortened time interval up to the individual compensation of a plurality of disturbances during a revolution of the recording medium are provided as time interval for inserting the follow-up signal value. The invention is intended to be applied for playback or recording units of optical recording media.

11 Claims, 8 Drawing Sheets

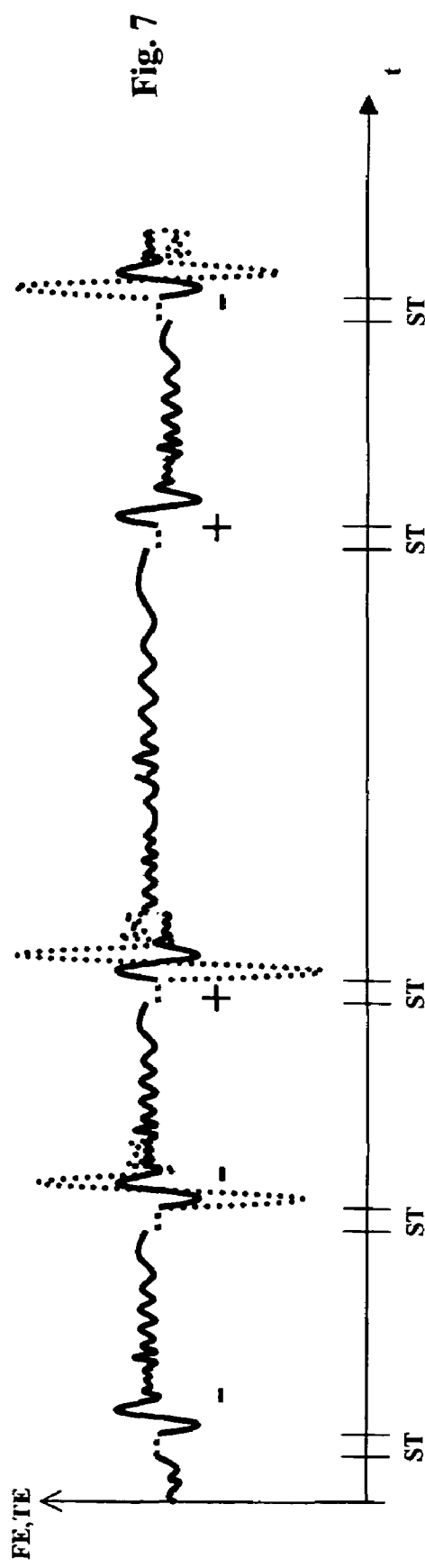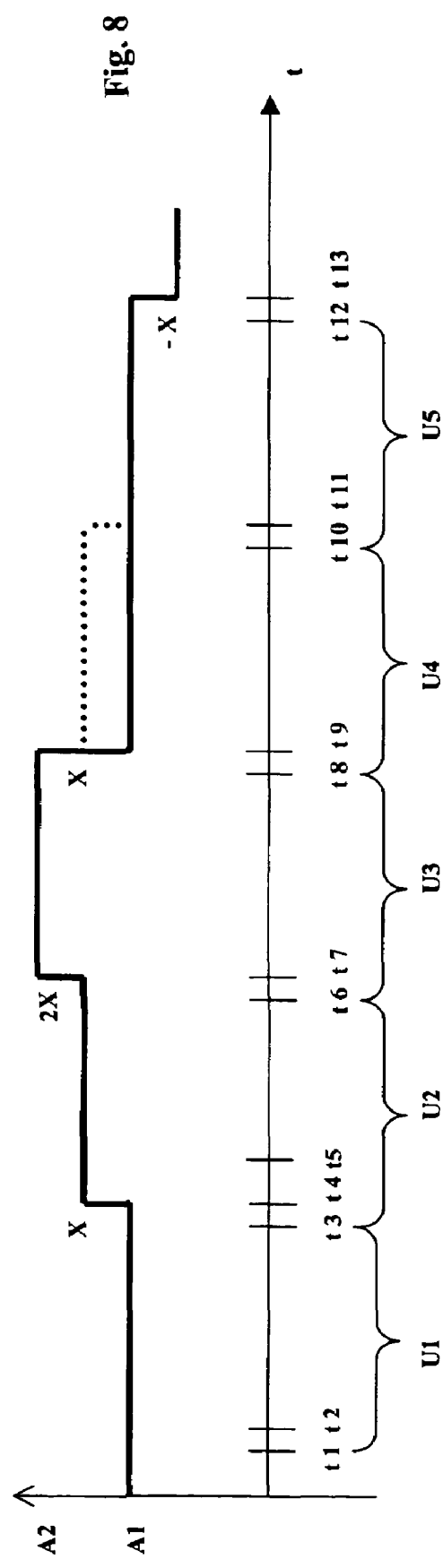

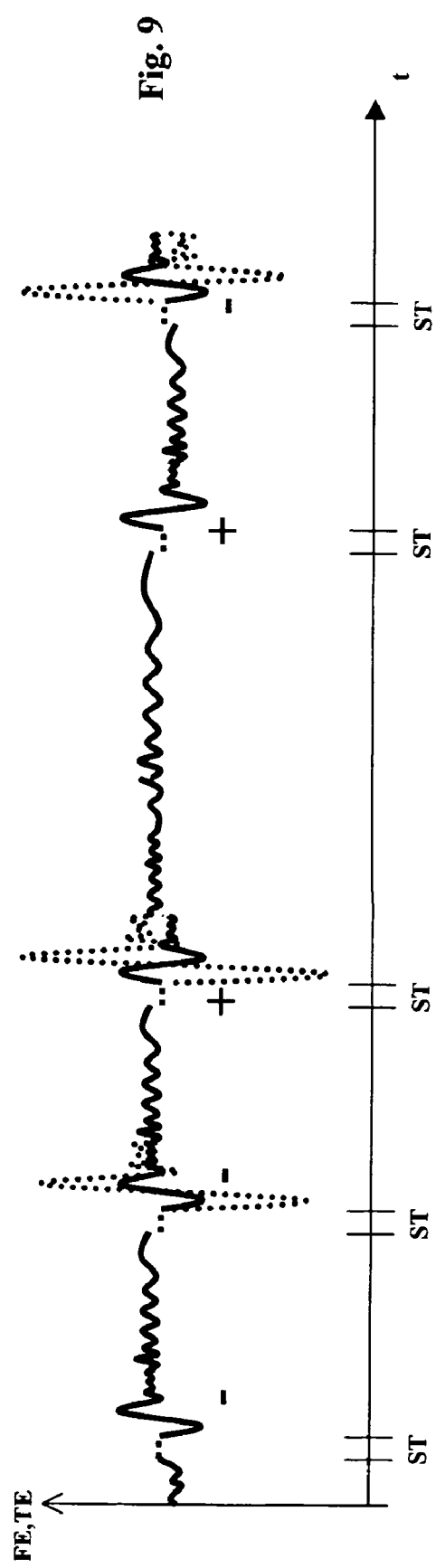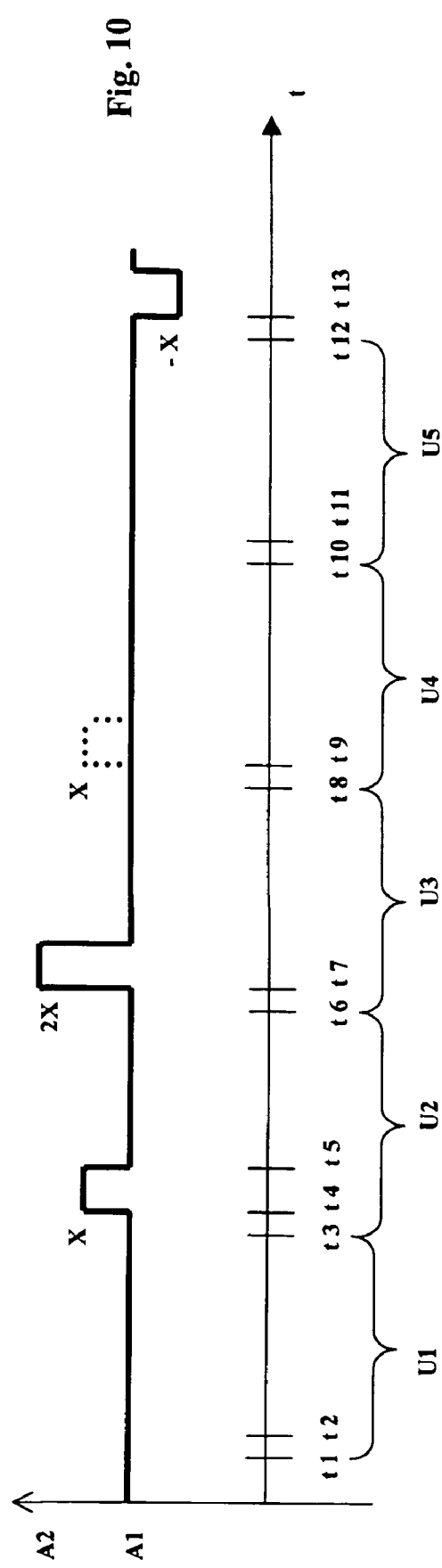

Figure 1:
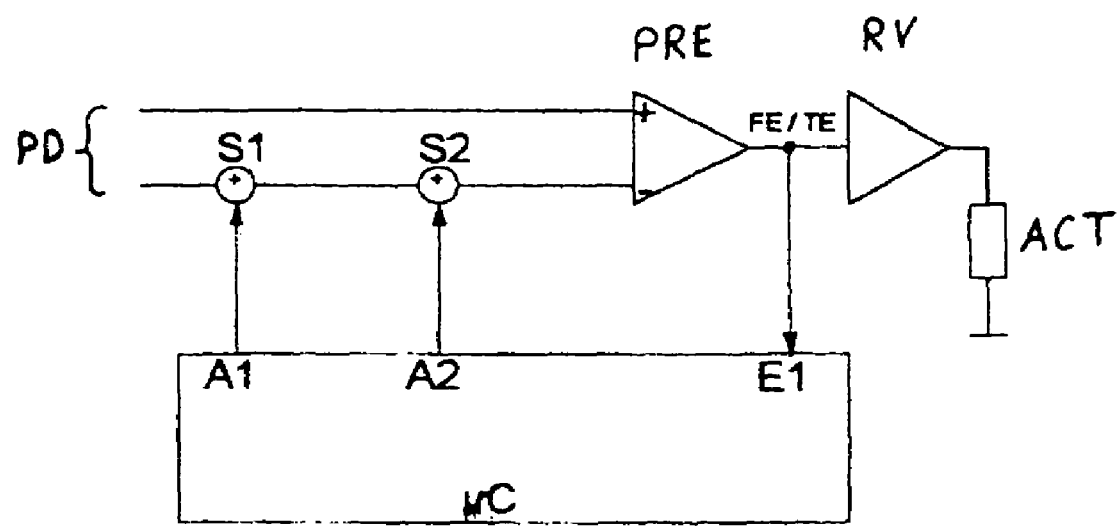

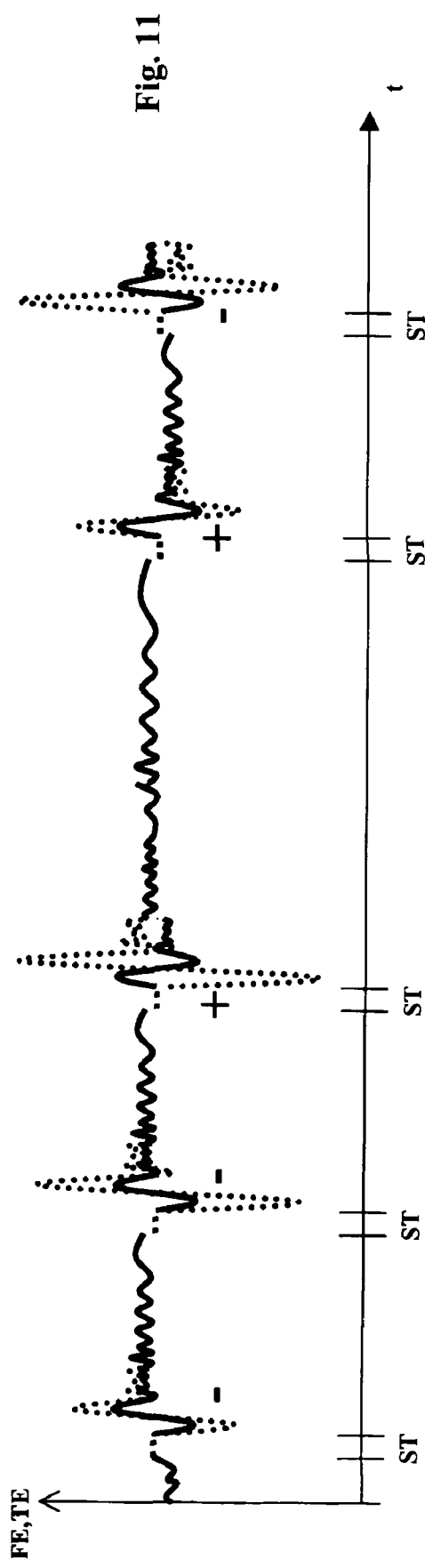
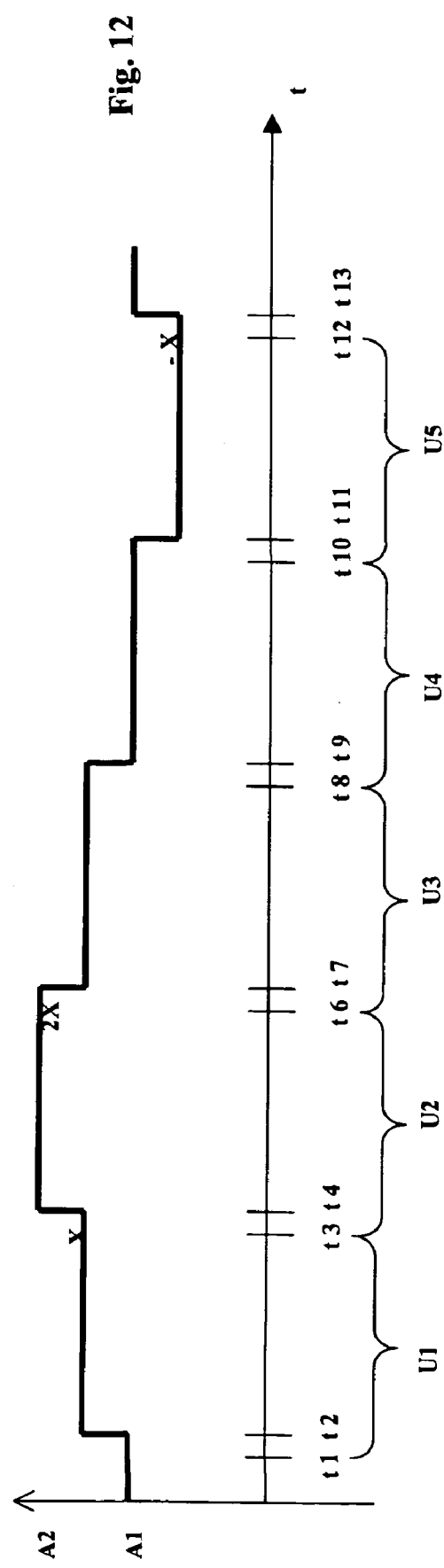

METHOD AND ARRANGEMENT FOR COMPENSATING SCANNING DISTURBANCES ON OPTICAL RECORDING MEDIA

This application claims the benefit, under 35 U.S.C. 119, of German patent application No. 103 06 894.5 filed Feb. 18, 2003.

FIELD OF THE INVENTION

The invention relates to a method and an arrangement for compensating scanning disturbances on optical recording media which are caused, in particular, by scratches or dirt on the optical recording medium, and which disadvantageously influence the scannability of the optical recording medium with the aid of a light beam or laser beam in a playback or recording unit.

BACKGROUND OF THE INVENTION

In a playback or recording unit for optical recording media, the data track of the recording medium is scanned with the aid of a light beam or laser beam, which is denoted as scanning beam and is held on the spiral-shaped data track of the optical recording medium with the aid of a focusing control loop and a track control loop. The scanning beam can consist in this case of one or more light or laser beams directed onto the recording medium. Optical recording media, such as for example the CD or DVD, are very largely unprotected, and so general handling is enough for their surface to have scratches or dirt, denoted below as defect or disk disturbance, such as dust or fingerprints, for example. Moreover, defects can occur as early as during the production process, for example owing to intrusions. Defects in the optical recording medium cause disturbances in the focus and/or track control loop, since no control signal can be formed in the defective region with the aid of the scanning beam, or the control signal is greatly falsified so that the scanning beam leaves the data track in an uncontrolled fashion and usually traverses a plurality of data tracks. The disturbance is detected and an attempt is made to reduce the effects on the control loops by means of a slight control loop amplification or by masking out the interference signal. As soon as the scanning beam once again reaches a data track without a defect, the focusing and the scanning location reached after the disturbance are checked. Subsequently, a control signal is generated in order to guide the scanning beam back to the location of the track loss, and to skip the defective region with the aid of a slight control loop amplification, a targeted jump or use of a stored or retained control signal. It has already been proposed to reduce the error rate with the aid of an offset voltage dependent on the location of the defect in relation to the resulting disk wobble. However, it has emerged that because no account is taken of the distance from the location of the track loss or of the data losses associated therewith, scanning disturbances can be compensated only insufficiently with the aid of the error rate as the number of false bits compared to the number of bits received overall. The scannability of a playback or recording unit in the case of defects on the optical recording medium is additionally influenced by the type and size and/or duration of the defect as well as by numerous further parameters such as the radial eccentricity, the vertical disk wobble, the tangential scanning angle and the accuracy of trimming of symmetry and offset of the control signals, the resultant practice being the occurrence of large tolerances with regard to the scannability of optical recording media in a playback or recording unit.

SUMMARY OF THE INVENTION

It is an object of the invention to specify a method and an arrangement for compensating scanning disturbances on optical recording media by using simple means with the aid of which the scannability of the playback or recording units is increased in the case of defects of the optical recording medium, and data losses are reduced.

It is an aspect of the invention to fashion playback or recording units for optical recording media such that scanning disturbances can be compensated as far as possible despite a defect on the optical recording medium, and that data losses owing to defects on the optical recording medium are reduced using simple means.

It has been found that the scannability of the playback or recording units for optical recording media with defects is influenced by the offset of the control loops. Although an offset adjustment is carried out automatically and repeatedly in the playback units and also in the recording units, an optimum result is frequently not achieved because of continuously changing parameters. It has been found that the settling behavior of the control loops after a defect leads to scanning disturbances and data losses although the error signal detected during the disk disturbance is damped or suppressed, or a previously detected error signal during the disk disturbance is used. This is ascribed to the fact that despite these attempts to compensate scanning disturbances after the disk disturbance a large system deviation occurs which cannot be foreseen owing to the type and direction in which the disk disturbance is approached with the scanning beam on the basis of the preceding control, and to the type of disk disturbance, with the result that even a direct compensation of a control signal detected after a disk disturbance does not decisively improve the scannability.

Since the defect of the optical recording medium cannot be removed in the playback or recording unit, it is provided to compensate the scanning disturbances stemming from a defect with the aid of simple means, although it seems to be virtually impossible to predict the behavior of the control loop in the case of a defect since, for example, even repeatedly approaching the same defect leads to different results owing to the integrating component in the transfer function in the control loop, and it is impossible to foresee variations in the defect from track to track. The integrating component in the control loop has the effect that account is also taken of the control prehistory during the current control operation, and this leads to different approach angles from which the defect is approached.

In order to compensate scanning disturbances on optical recording media using simple means, a method is proposed in which an offset set in the control loop does not remain constant but is adapted to the defect and/or to the respective scanning disturbance. In order to achieve this, in the case of a scanning disturbance caused by a defect the settling behavior of the control loop is evaluated at the end of the defect or after a defect. In accordance with the settling behavior of the control loop, which is evaluated at least with regard to the direction of the settling amplitude, there is then generated for a prescribed time interval a follow-up signal that is coupled as offset into the control loop. The follow-up signal is an offset which, for the purpose of compensating scanning disturbances, is varied in prescribed steps or derived from the settling amplitude. Denoted as offset in this case is the variation in offset value set in the control loop which is, for example, an offset voltage or a digital value in a digital control loop. In addition to the offset values in the focus and track control loop, the method and the arrangement can also be applied, for example, to the track balance setting or the so-called data slicer, which likewise have means for setting the offset. Provided as period of time for applying the offset value, provided as follow-up signal, is a time interval that corresponds in accordance with an exemplary embodiment to a complete disk revolution. The offset value is then adapted with each revolution to the settling behavior of the control loop. The offset value provided as follow-up signal remains applied for a complete disk revolution and is not modified again until subsequently. Not until after the defect no longer occurs is the offset value canceled immediately or in a weighted fashion. If an already adjusted offset of the unit is not modified in wide limits, this is not disadvantageous for the region without defects if no further strongly expressed defects are located in the region of the revolution. In accordance with a further exemplary embodiment of the invention, the offset value provided as follow-up signal, or offset values provided is/are coupled into the control loop only in the region of the defect or in the region of the settling amplitude over a time interval that corresponds, for example, to twice the length of the occurrence of the defect. Individual disturbances are thereby compensated individually, and a plurality of different defects are compensated optimally in adapted fashion.

It has been found that even relatively slight offset value variations improve the scannability such that, as a rule, only a relatively small range or component of the overall offset adjustment region need be varied, and this then does not influence the scannability disadvantageously when it is retained for a complete disk revolution.

What is involved in principle is a dynamically acting fine adjustment of the already adjusted offset that is adapted to the respective disturbance and/or to the defect.

In accordance with a further exemplary embodiment, in the event of a detected defect the follow-up signal is formed in a control loop in such a way that after at least one revolution and the renewed occurrence of the defect an offset value is used that acts by at least one step width counter to the direction of the settling amplitude. Denoted as step width in this case is the smallest unit by which the offset value can be varied. Any influence of the varied offset value on the settling behavior of the control loop is detected, and a further variation to the follow-up control is undertaken in accordance with the target direction, which consists in reducing the amplitude of the settling signal. This operation is then repeated until the sign of the settling amplitude changes. At this instant, the optimum offset value is found for this disk disturbance or defect at the corresponding disk position. By virtue of the fact that the offset is not coupled into the control loop until the defect occurs anew after approximately one revolution, it is possible for further defects emerging during this revolution to be detected, and for a follow-up signal to be coupled into the control loop as early as during the defect.

In analog control loops, an appropriate offset voltage is fed as DC current signal into the control loop, the step width of which is, for example, 10 mV, and which has a polarity that counteracts the settling amplitude. The step width of the follow-up control, which corresponds to the level of the follow-up signal value, is directed in accordance with the control range and the sensitivity of the control loop. It is possible in principle to use both constant step widths and those which rise linearly, nonlinearly or in a weighted fashion. In accordance with a further design, use is made of a follow-up signal value that corresponds approximately to 10% of the amplitude of the settling signal and has a sign that counteracts the amplitude of the settling signal. Provided here, as well, as the period of time for applying the offset provided as follow-up signal is a time interval that, as specified above, corresponds to one disk revolution or at least approximately twice the length of occurrence of the defect. Moreover, for large follow-up signal values further designs provide for reducing the follow-up signal value linearly or nonlinearly with the duration of the insertion of the follow-up signal value, and for reducing the follow-up signal value not in jumps but in stepwise fashion in the absence of a defect after one revolution.

Also provided are embodiments in which the offset provided as follow-up signal is inserted into the control loop for a shorter time interval than one revolution of a disk or straight away without delay when the settling amplitude exceeds a prescribed threshold value. Upon renewed occurrence of the disk disturbance after one revolution, a previously used offset value can then already be used just before or during the disk disturbance.

The follow-up control is fashioned in such a way that control is always performed by the settling behavior of the control loop, which varies in phase. As a result, continuous changes in the settling behavior, which originate from the abovenamed parameter changes and from a disk disturbance ST that varies from revolution to revolution are detected and optimally compensated. It is also possible to carry out the follow-up control only as far as a prescribed reduction in the settling amplitude. The scanning disturbance originating from the settling behavior of the control loop after a defect is thereby compensated as far as possible.

Since, because of the small track spacing, the disk disturbances do not, as a rule, change discontinuously from revolution to revolution of the recording medium, but continuously change up to a maximum value and then decrease again, it is sufficient to undertake an evaluation of the settling behavior, and a subsequent change to the offset value with each revolution or after a plurality of revolutions. Offset values set in the playback or recording unit are optimally adapted with the aid of this method to the defect and the instantaneous scanning parameters. These can be provided in one or a plurality of control loops in the playback or recording unit. The scannability of the playback or recording unit in the event of defects on the optical recording medium is increased, and data losses are reduced by virtue of the fact that as a consequence of a defect the scanning beam is not removed from the data track, or is only slightly removed, and is not, above all, directed onto a neighboring track, and so data can be read from the data track or be recorded in the track of the optical recording medium as early as immediately after the defect.

In order to detect the scanning disturbance, in a simple embodiment a comparator is provided with the aid of which the settling behavior or the direction of the amplitude of the control signal after a defect on the recording medium is monitored.

In accordance with further embodiments, it is provided to evaluate the control loop settling amplitude after a defect in a quantitative and/or qualitative fashion, doing so, for example, using an analog-to-digital converter and a microprocessor or a control unit. A new value for the follow-up control of the offset is then derived from the variation in the control loop settling amplitude.

This means, for example, that large follow-up control values are used for small variations in the settling amplitude, and vice versa. Moreover, the duration and type of the disk disturbance can be used as input parameters for generating the size and duration of the follow-up signal value for the purpose of compensating scanning disturbances.

Since both playback units and recording units for optical recording media such as, for example, CD and DVD players and corresponding recorders already have devices for offset adjustment and detectors or circuit arrangements for detecting defects on the recording media, these can be used advantageously without additional outlay for the purpose of the proposed compensation of scanning defects and/or in order to increase the scannability of the playback or recording units for optical recording media. Only additional control software is then still required to carry out the proposed method.

In principle, the detection of the settling amplitude can be undertaken anywhere in the servocontrol loop and is not limited to the error signal location. The manipulated variable can likewise be fed in at any desired location in the servocontrol loop, and is not limited to the input stages of the servocontrol loops. Moreover, modifications of the method can also be applied such as, for example, starting the follow-up control as early as during the disk disturbance or before the disk disturbance, using the follow-up signal for a shorter or longer time interval, not applying the follow-up signal until after at least one settling amplitude, or inserting the follow-up signal not in jumps but in a fashion rising gradually to the follow-up signal value, or allowing it to fall in such a way. Further embodiments of the invention consist in that in the case of a plurality of disk disturbances per revolution each individual disk disturbance or only the strongest disk disturbances with the largest settling amplitude are evaluated. For this purpose, a microprocessor stores the individual disk disturbances and undertakes an appropriate adaptation of the follow-up control of the offset to the respective disk disturbance.

If more than one disturbance is being evaluated, the offset provided as follow-up signal is no longer used for the duration of a complete revolution unless the follow-up signal applied acts equally well on all disk disturbances within permissible limits. This can occur when the individual disturbances are situated close to one another and are of the same type. Such disk disturbances can then be detected as one disturbance and be compensated in accordance with the method.

If this is not possible, the kth offset value is to be applied briefly, for example, for the 2 to 3-fold duration of the disturbance before the kth disturbance. This kth offset value then remains applied for the 2-fold duration of this kth disturbance until the settling amplitude drops below a prescribed threshold value. It also holds here in general that the follow-up signal is not switched on or off abruptly in the case of larger coupling values.

Moreover, the follow-up control of the offset is dimensioned in accordance with a further design such that the settling amplitude adopts a preferred direction. It has been shown in practice that, depending on the type of disk disturbance, for example if the limit of scannability has been reached despite compensation measures, it is advantageous to control the actuator in such a way that the settling amplitude is directed in the forward direction of the scanning. This ensures that the continuous scanning is not interrupted and/or that the actuator does not stick, but that, in the most favorable case, the scanning beam travels over the same track, or is controlled onto the next track or onto one of the next tracks in the scanning direction. This is less disturbing by far than frequent interruptions of the scanning. This preferred direction can likewise be adapted to the respective disturbance.

A further design of the invention is provided, in particular, for playback units for optical recording media that scan the recording medium at an increased rate by comparison with the playback of the stored information. The scanned data are, for example, read at an n-fold rate into a memory that is read out at the single rate. Consequently, up to n disturbances can then be evaluated separately in one revolution by transferring into the memory from the neighborhood of the defect only the scanned values for which the compensation is active. Only one of the n disturbances is processed during each revolution, and so it is possible to process up to n disturbances one after another before the memory runs empty. Each of the defects is thereby processed separately per revolution. In order to achieve optimum compensation of the scanning disturbances, it is advantageous for no further parameters such as, for example, the approximately radial position or the gain in the control loop, to be varied during the disk disturbance in a prescribed time window.

The embodiments described here are specified as examples, and a person skilled in the art can implement other embodiments or combinations of the embodiments of the invention that remain within the scope of the invention, which consists in that the settling behavior of a control loop after a disk disturbance is evaluated at least with regard to direction, and an offset provided as follow-up signal is increased or reduced by prescribed values for a prescribed time interval as a function of the direction of the settling amplitude in order to reduce the settling amplitude. In particular, scanning disturbances caused by scratches or dirt on the optical recording medium are compensated with the aid of simple means, since there is no need for complicated calculations of a compensation signal, and offsets are set using means present in a playback or recording unit. By comparison with a compensation starting from the error rate, an increased scannability of the playback or recording units is achieved and data losses are reduced.

BRIEF DESCRIPTION OF PREFERRED EMBODIMENTS

Figure 2:
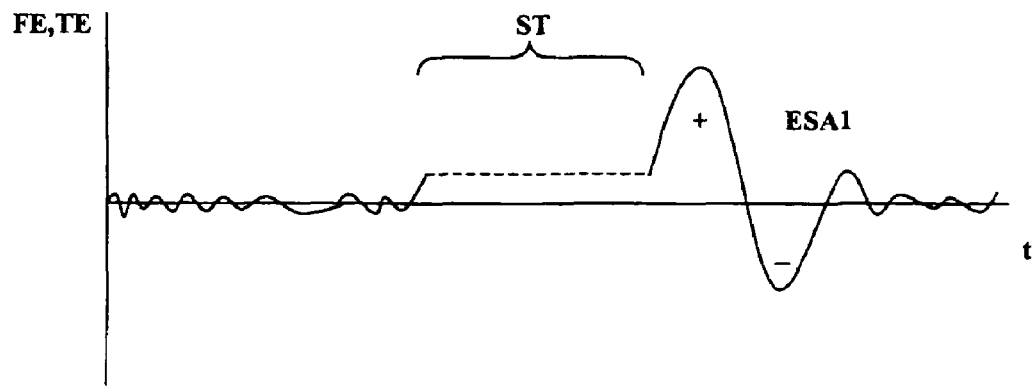
Figure 3:
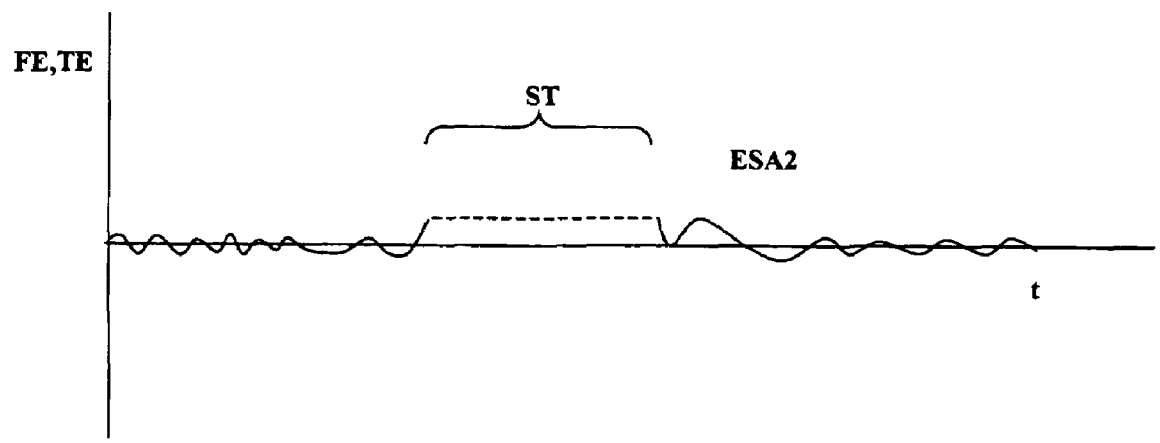
Figure 4:
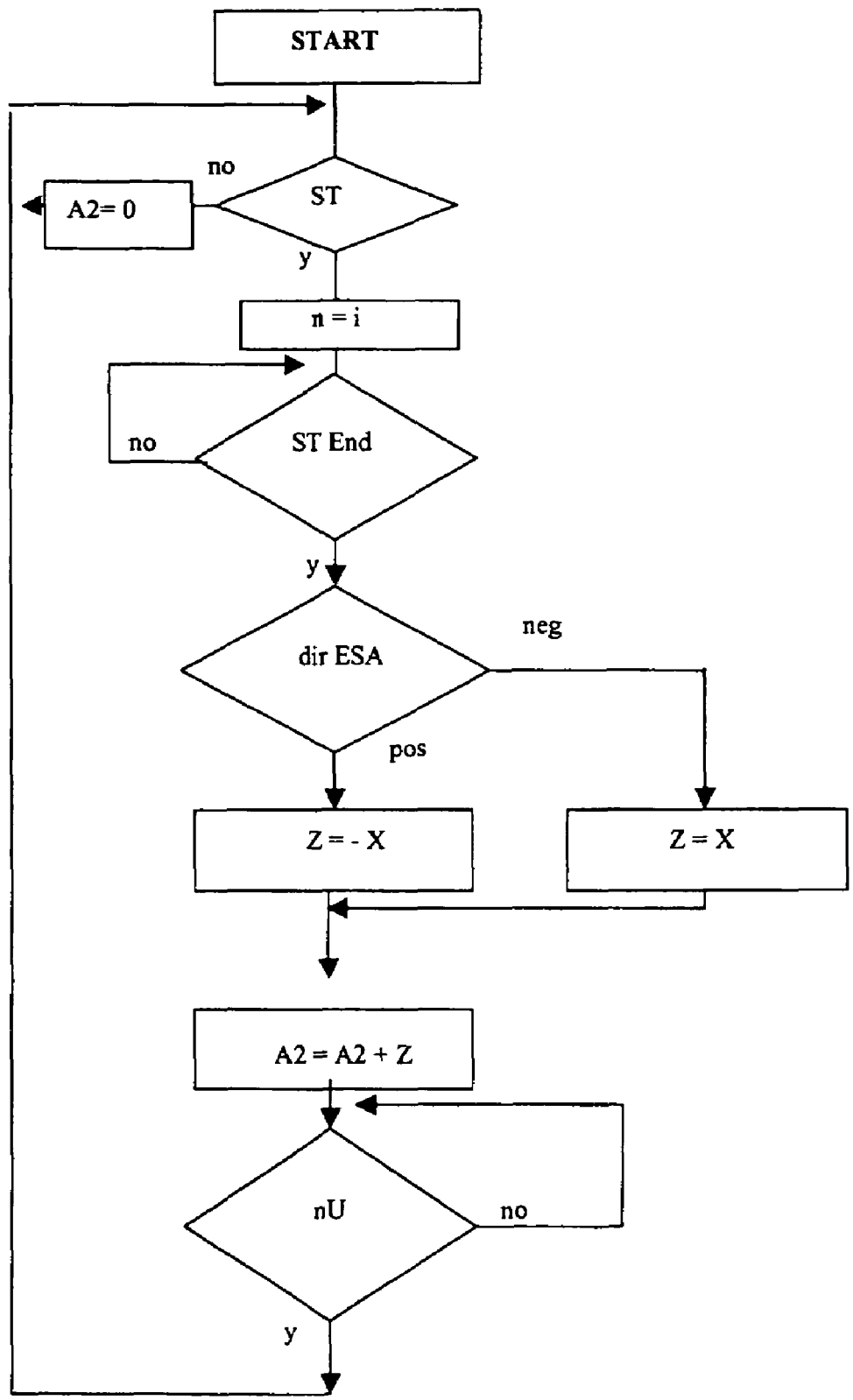
Figure 5:
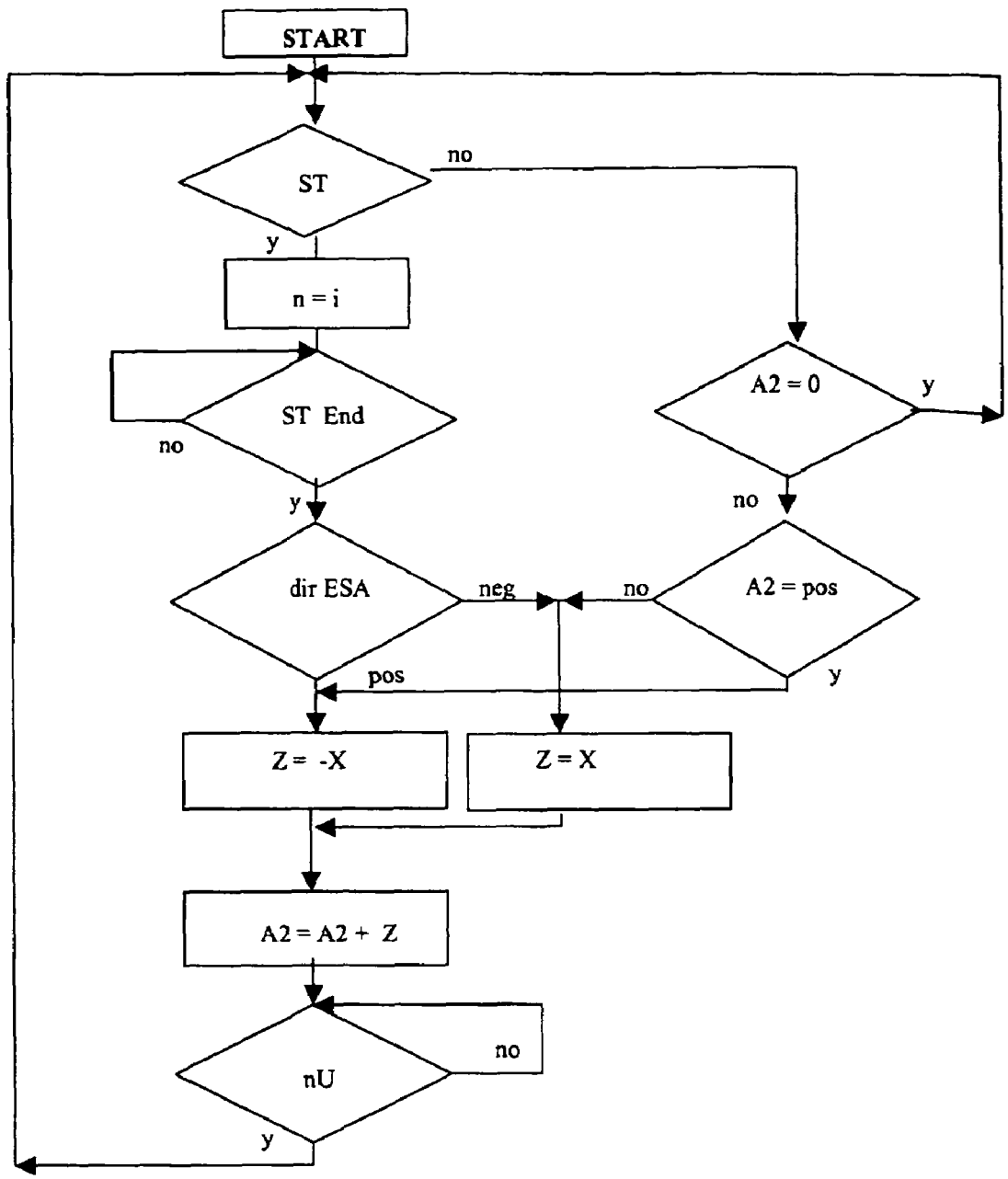
Figure 6:
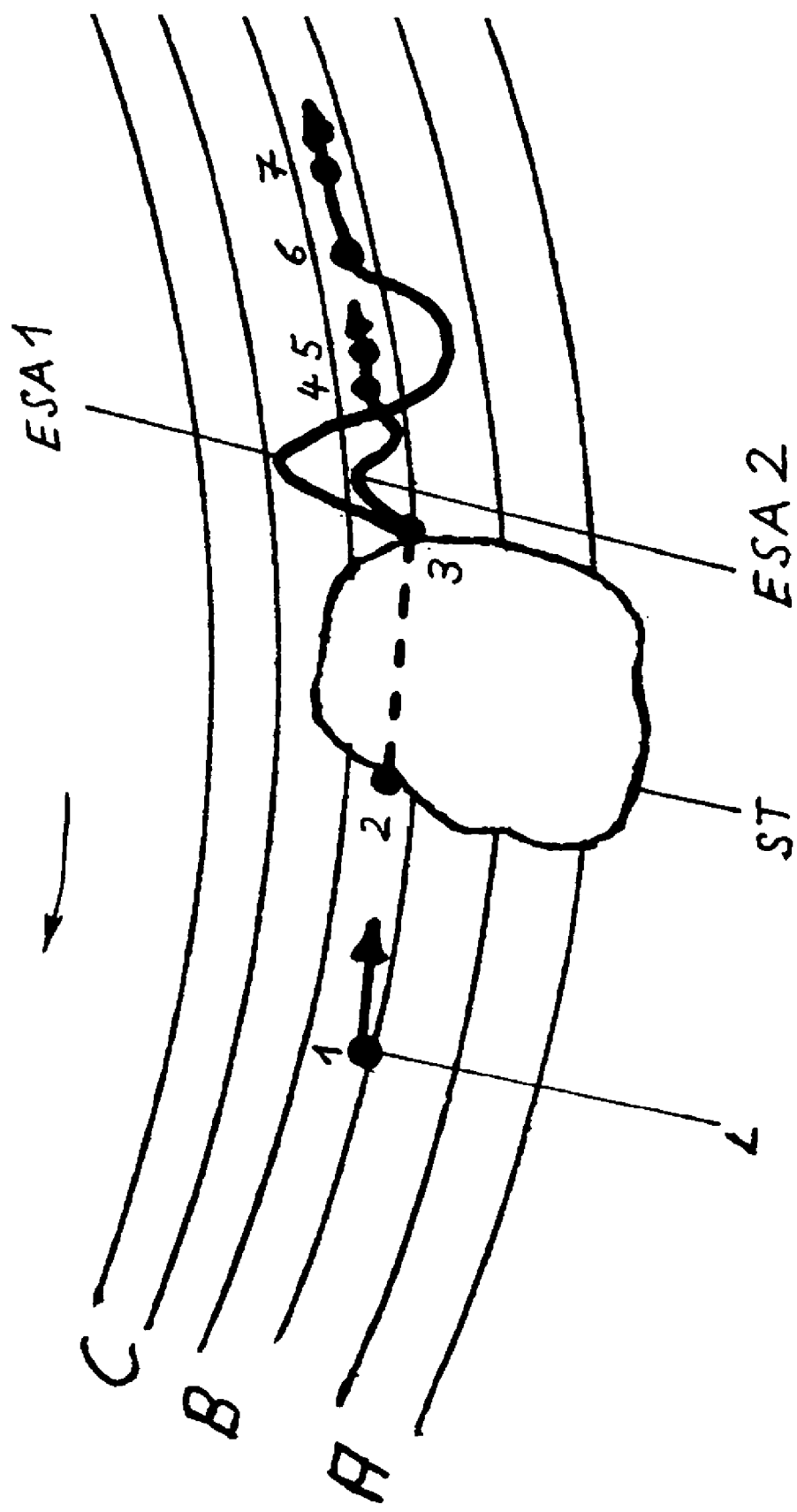

The invention is explained in more detail below, with the aid of exemplary embodiments, in drawings, in which:

FIG. 1 shows a block diagram of a circuit arrangement having means for compensating scanning disturbances in a playback or recording unit for optical recording media, FIG. 2 shows a signal diagram for the settling behavior without compensation, FIG. 3 shows a signal diagram relating to the settling behavior with compensation, FIG. 4 shows a flowchart for carrying out the method in accordance with FIG. 1, FIG. 5 shows a flowchart for carrying out the method with the aid of means for stepwise reduction of the offset coupling, FIG. 6 shows a diagram relating to scanning beam movements without and with compensation of the scanning disturbances, FIG. 7 shows an error signal diagram for illustrating the working of the method, FIG. 8 shows a signal diagram for varying the offset value in the control loop, FIG. 9 shows an error signal diagram for illustrating the working of the method, FIG. 10 shows a signal diagram relating to the shortened variation of offset value in the control loop, FIG. 11 shows error signal diagrams for illustrating the working of the method, and FIG. 12 shows a signal diagram for the immediate variation of offset in the control loop.

DETAILED DESCRIPTION OF PREFERRED EMBODIMENTS

Reference symbols are used in the figures in a coordinated fashion.

Illustrated in FIG. 1 is the block diagram of a circuit arrangement having means for compensating scanning disturbances in a playback or recording unit for optical media, as they occur, in particular, after a defect of the optical recording medium in a playback or recording unit. Provided in accordance with the exemplary embodiment illustrated in FIG. 1 is a control unit uC with the aid of which the settling behavior of the control loop is evaluated after a defect, and a follow-up signal A2 that is coupled into the control loop after a time prescribed interval. In order to reduce the settling amplitude of the control loop, the follow-up signal A2 is provided directly as an additional offset when the settling amplitude exceeds a predetermined threshold value or, upon renewed occurrence of the defect, after one revolution of the optical recording medium, and is generated after a defect as a function of the direction of the settling behavior of the control loop. Provided for this purpose in FIG. 1 are an input E1 of the control unit uC for detecting the settling behavior, and a second summation point S2 via which the follow-up signal A2 is coupled into the control loop as an additional offset. In order to simplify the circuit arrangement, it is provided in one embodiment to combine the follow-up signal A2 with an offset A1 fed into the control loop in a known way, such that a second summation point S2 and a second output at the control unit uC are superfluous.

The playback or recording units for optical recording media are sufficiently well known, and have at least one track control loop and one focus control loop for scanning the information stored on the optical recording medium or for recording information. These control loops are used to lead a scanning beam L on the data track B of the recording medium illustrated in FIG. 6, in a detail. As a rule, the control loops are independent of one another and are treated here in common merely for reasons of simplification, since the principle on which the invention is based can be applied in the same way both for the track control loop and for the focus control loop. In such a control loop, the light reflected by the recording medium is detected in an open way with the aid of a photodetector PD and fed as difference signal to a difference amplifier PRE illustrated in FIG. 1. The difference amplifier PRE is a preamplifier whose output provides the detected error signal in the control loop in a known way. In the track control loop, this error signal is the track error signal TE, and in the focus control loop it is the focus error signal FE. These error signals, illustrated in FIGS. 2 and 3, are fed in the corresponding control loops to a control amplifier RV that controls an actuator ACT for track guidance and for focusing the scanning beam L on the recording medium. The light reflected by the recording medium is then detected with the aid of the photodetector PD. Means for setting the offset or for compensating the offset are provided in the control loops in order to set operating points as well as to compensate mechanical and electrical tolerances. Means and methods for setting offsets are generally known, and so a more detailed explanation is superfluous here. The offset adjustment is carried out automatically and repeatedly in control loops with a microprocessor or a control unit uC, as illustrated by way of example in FIG. 1. However, the offset adjustment is carried out not only with regard to the static track error signal TE and focus error signal FE, but also extends, for example, to the symmetry of the control signals, this setting being denoted as so-called balance trimming. The control unit uC is used to determine appropriate correction values that are coupled into the control loop as offset A1 via a summation point S1 as constants up to the renewed adjustment. As illustrated in FIG. 1, this coupling is carried out in the analog signal domain or in the digital domain in the case of digital signal processors, and retained as a constant during reading or writing of information until the renewed adjustment. Despite the said adjustment operations, scanning disturbances occur during the reading and writing of information when the recording medium has scratches, inclusions or dirt such as, for example, dust or fingerprints, that are later denoted as a defect or disk disturbance ST. These scanning disturbances are to be ascribed to the fact that the optical recording media do not reflect light, or do so only indifferently, in the defective region, and that the photodetector PD provides error signals FE or TE that are not suitable for focusing or for track guidance of the scanning beam L, or control the scanning beam L away from the focus or to leave the data track B of the recording medium.

FIG. 6 shows a diagram of the movements of a scanning beam L on the data tracks A to C of an optical recording medium without and with compensation of the scanning disturbances that originate from a disk disturbance ST. In accordance with FIG. 6, the scanning beam L is led from the data track B of the recording medium with the aid of the control loops for track guidance and focusing. If the scanning beam L leaves the middle of the data track B, for example, as illustrated at point 1 in FIG. 6, this deviation is detected with the aid of the photodetector PD and a corresponding track error signal TE is provided and used to lead the scanning beam L back to the middle of the data track B as at point 2 in FIG. 6, for example. If the scanning beam L strikes a disk disturbance ST, this is likewise detected with the aid of the photodetector PD, although it is impossible to detect any track error signal TE during the disk disturbance ST, or the track error signal TE is so greatly falsified that the scanning beam L leaves the data track B in an uncontrolled fashion and offer traverses a plurality of data tracks. In order to prevent this and to traverse the disk disturbance ST without track loss as far as possible, it has already been proposed to reduce the control loop gain during the disk disturbance ST or to blank out the interference signal and to retain a stored or the last-used track error signal TE and/or focus error signal Fe. Despite these measures and also, inter alia, by virtue of the fact that the prehistory of the control is always taken into account owing to the integral component in the transfer function of the control loop, there occurs at the end of the disk disturbance ST, which corresponds to point 3 in FIG. 6, a discontinuous system deviation that causes a scanning disturbance. The focus control loop and the track control loop respond to a discontinuous control deviation and control the scanning beam L with a large settling amplitude ESA1 such that it is possible to focus the scanning beam L and to play back or record information only after the settling amplitude ESA1 has decayed. A very large settling amplitude ESA1 can lead in this case to the loss of the data track such that in addition to renewed focusing of the scanning beam L it is necessary to lead the scanning beam L back onto the data track B to be scanned.

However, even in the case of a relatively small settling amplitude ESA1, as illustrated in FIG. 6, it becomes possible to play back data or record information only starting from point 6 or point 7, and so because of the disk disturbance ST data or information in the region between the points 3 and 7 can still be neither played back nor recorded, and data losses are unavoidable.

In order to avoid the data losses or to compensate the scanning disturbances that originate from a disk disturbance ST, a method is therefore proposed that is illustrated in embodiments as a flowchart in FIGS. 4 and 5. If the result of a check or interrogation in the flowcharts is positive, this is marked by y (yes) and in the other case it is marked by no in the flowcharts. In accordance with the exemplary embodiment illustrated in FIG. 4, after the beginning START of the scanning of the optical recording medium a check is made as to whether a disk disturbance ST is present or not. If the result is no, that is to say there is no disk disturbance ST, as specified in FIG. 4 by no, the value for the follow-up signal A2 is set to zero 0. In the case when a disk disturbance ST is present, as is specified in FIG. 4 by y, a check is made as to whether this is a disk disturbance ST that has already occurred at the same, or in the region of the same location n=i before one or more revolutions nU of the recording medium. It is ensured thereby that the follow-up signal value A2 subsequently determined is related to a disk disturbance ST in the region of the same location i before one or more revolutions nU of the recording medium. Checking after a plurality of revolutions nU of the recording medium is provided, in particular, when the aim is not to undertake checking the presence of a disk disturbance ST or a variation in the follow-up signal A2 with each revolution U of the recording medium. In order to find the same location i or a region of the same location i after one or more revolutions nU, use can be made of the duration of a revolution, or of other known methods while scanning the recording medium at constant angular velocity.

Once the end of a disk disturbance ST End has been reached, the direction of the settling amplitude dir ESA is checked in the control loop. If the direction of the settling amplitude dir ESA is detected as negative neg, a value Z is formed which corresponds at least to one step width X of the offset setability in the control loop, is added to a follow-up signal value A2 already used, and forms the new follow-up signal value A2. If the direction of the settling amplitude dir ESA has been detected as positive pos, a value Z corresponding to at least one step width X of the offset setability in the control loop is formed with a negative sign, is then added to a follow-up signal value A2 already used, and forms the new follow-up signal value A2. In principle, given the direction of the settling amplitude dir ESA detected as positive pos, the new follow-up signal value A2 can also be formed by subtracting at least one step width X of the offset setability in the control loop from a follow-up signal value A2 already used, when a value Z with a positive sign is used. The sign of the value Z or the increase or reduction in the follow-up signal value A2 is to be fashioned in this case such that the follow-up signal value A2 fundamentally counteracts the settling amplitude ESA or ESA1. That is to say, after at least one revolution U upon the renewed occurrence of the disk disturbance ST a follow-up signal value A2 is inserted as offset into the control loop and counteracts the settling amplitude ESA or ESA1. As illustrated in FIG. 6, deviations of the scanning beam L from the middle of the data track B are reduced by the occurrence of a smaller settling amplitude ESA2 that leads to smaller data losses because of the comparatively smaller distance between the points 3 and 4 or 5 at which reading or recording information can be started. The scanning disturbance originating from a disk disturbance ST is thereby compensated. In this case, at least one step width X of the offset setability in the control loop means that the follow-up signal A2 is varied in steps that are used in the control loop in the customary way during setting of the offset A1. However, it is also possible in principle to use other step widths X. And, after at least one revolution nU in conjunction with the renewed occurrence of the disk disturbance ST, this means that it is also possible not to use the new follow-up signal A2 as follow-up signal A2 until after a plurality of complete revolutions nU. On the other hand, the follow-up signal A2 can also be inserted into the control loop as early as when the settling amplitude ESA exceeds a threshold value for the first time.

The follow-up signal A2 is inserted into the control loop in addition to the set offset A1 for a prescribed time interval that corresponds to one revolution of the disk or at least twice the duration of the disk disturbance ST. As a rule, disk disturbances ST extend over a multiplicity of data tracks and since, because of the small track spacing, as a rule the disk disturbances ST do not change discontinuously from revolution to revolution of the recording medium, but continuously change up to a maximum value and then decrease again, it is sufficient to undertake an evaluation of the settling behavior, and a subsequent change to the follow-up signal A2 with each revolution. The specified method leads fundamentally to reducing the settling amplitude ESA1 of the control loop after a disk disturbance ST, and so smaller system deviations occur in the control loop and are, in accordance with FIG. 3, reflected in the smaller amplitude of the track error signal TE or focus error signal FE. FIGS. 2 and 3 illustrate the track error signal TE and the focus error signal FE on a common axis plotted against time t, and it is to be remarked to this end that this concerns a normalized representation for illustrating the principle, since the absolute values of these signals differ enormously from one another as a rule. The track error signal TE and the focus error signal FE are strongly disturbed, or cannot be detected, during a disk disturbance ST, as is illustrated in FIGS. 2 and 3 by a dashed line, and the signs + or − specify the direction of the settling amplitude ESA1 after the disk disturbance ST. The larger the settling amplitude ESA1, the larger is the deviation of the actuator ACT or scanning beam L from the desired position at the middle of the data track B to be scanned. As illustrated in FIG. 3, a substantially smaller settling amplitude ESA2 occurs with the compensation of the scanning disturbance.

The method illustrated in FIG. 4 is repeated for the purpose of reducing the settling amplitude ESA1 until the sign + or the direction of the settling amplitude ESA1 changes. At this instant, the optimum follow-up signal value A2 or offset for this disk disturbance ST is found. The follow-up control is designed in such a way that control is always performed by the settling behavior, which varies in phase. As a result, continuous changes in the settling behavior, which occur as a result of parameter changes and a constantly varying disk disturbance ST are detected and optimally compensated.

In accordance with a further aspect of the invention, it is to be ensured that in the case of abrupt changes in the disk disturbance ST the follow-up signal A2 does not disadvantageously affect the scannability of the playback or recording unit, since abrupt changes in large follow-up signal values A2 can counteract the targeted reduction in the settling amplitude ESA1. Abrupt changes in the disk disturbance ST occur, for example, in the case of heavy fingerprints, since, in particular, the papillae forming the skin relief are imaged in the form of strips on the recording medium. Specified for this purpose is an exemplary embodiment that is illustrated in FIG. 5 as a flowchart and is provided for gradually reducing high follow-up signal values A2. The flowchart given in FIG. 5 contains all the elements and functions of the flowchart illustrated in FIG. 4 with the difference that, in this case, when a disk disturbance ST does not occur repeatedly, a check is made as to whether the current follow-up signal value A2 is equal to zero 0. If this is correct, the occurrence of the next disk disturbance ST is awaited, and the method is carried out as specified above. If, by contrast, after at least one revolution U of the recording medium there is no new occurrence of a disk disturbance ST, as is specified in FIG. 5 by no, and if use has previously been made of a follow-up signal A2 that is not no equals zero 0, a check is made as to whether the follow-up signal value A2 used so far is positive pos or negative. If the follow-up signal value A2 used so far is not no positive pos, a value Z corresponding at least to one step width X of the offset setability in the control loop is formed and is added to the follow-up signal value A2 already used. A negative follow-up signal value A2 used so far is thereby reduced in stepwise fashion from revolution to revolution. If by contrast, the result of the check is y, that the follow-up signal value A2 used so far is positive pos, it is reduced in stepwise fashion from revolution to revolution by adding negative values Z. This prevents large jumps in the variation of the follow-up signal A2, and thus increased settling amplitudes ESA. In the exemplary embodiments specified here, use was made of a step width X of 10 mV with a polarity that counteracts the settling amplitude ESA.

In order to illustrate the method, FIG. 7 illustrates the influence of the compensation on the focus error signal FE or on the track error signal TE, and FIG. 8 illustrates the changes, undertaken to this end, in the offset A1 or on the follow-up signal value A2 in a signal diagram plotted against a time interval t lasting a plurality of revolutions U1 to U5. The time axes t of the signal diagrams in this case have a corresponding scaling such that the instants t1 to t13 in FIG. 8 likewise refer to FIG. 7. In accordance with the proposed method, a disk disturbance ST is detected at instant t1 in a servocontrol loop adjusted with respect to the offset values A1, and this is illustrated in FIG. 7 by a dashed line for the time interval between t1 and t2. During the disk disturbance ST, already known methods can be used to skip the disk disturbance ST, such as reducing the gain in the control loop or holding the control signal used before the disk disturbance ST. In spite of these measures, directly after the disk disturbance ST there occurs in the control loop a control response increased settling amplitude that is reflected in a larger amplitude of the focus error signal FE and/or the track error signal TE in FIG. 7. After the disk disturbance ST, a settling amplitude with a negative neg direction is detected starting from instant t2, and this is illustrated in FIG. 7 by a minus sign –. Because of the settling amplitude with a negative neg direction, the method illustrated in FIGS. 4 and 5 generates a positive follow-up signal value A2 that, as illustrated in FIG. 8, has a level or step width X. After one revolution U1 of the recording medium which corresponds to instant t3 in FIG. 8, the disk disturbance ST occurs anew in amplified fashion. At this location of the recording medium, the disk disturbance ST occurring here more strongly would cause a settling behavior of the control loop with a correspondingly larger amplitude, as is specified in FIG. 7 by a curve illustrated by dashes. The larger settling amplitude of the control loop would lead to a larger deviation of the scanning beam L from the middle of the data track B and, possibly, even to the loss of the data track to be scanned.

In order to increase the scannability and to avoid data losses, in accordance with the proposed method the follow-up signal A2 is inserted as additional offset into the control loop at the end of the disk disturbance ST at instant t4. The follow-up signal A2 is inserted into the control loop as additional offset for a time interval between t4 and t7, and so use is made during this time of an offset, increased by the follow-up signal A2, during the settling of the control loop after the disk disturbance ST starting from instant t4. The follow-up signal A2 counteracts the settling amplitude and reduces it, as shown by a comparison, illustrated in FIG. 7, between the curve of the settling behavior as illustrated with dashes and continuously. Nevertheless, an increased settling amplitude with a negative direction is still detected even after this disk disturbance ST, as is illustrated in FIG. 7 by the continuous line of the curve in the region between t4 and t5 after the disk disturbance ST. Consequently, in accordance with the proposed method the follow-up signal A2 increased by a step width X is fed to the control loop after a further revolution U2 of the recording medium and the renewed occurrence of the disk disturbance ST. The offset A1 used for the adjusted control loop is therefore increased by a twofold step width 2X for a prescribed time interval after instant t7. The result of this is that an increased settling behavior such as is specified by a dotted line is reduced to the settling behavior illustrated by a continuous line. The reduction in the settling amplitude with the follow-up signal A2 even leads here to a variation in the direction of the settling amplitude, as is illustrated by the plus signs in FIG. 7 and the profile of the settling amplitude. The disk disturbance ST does not occur anew after a further revolution U3, and so in the case of follow-up signal values A2 that have already been formed from a larger number of step widths X in one direction and are therefore very high, the follow-up signal value A2 used starting from instant t7 would not, according to the method specified in FIG. 5, be reduced abruptly, but by one or more step widths X, as is specified by a dotted line in FIG. 8 starting from instant t9. After a further revolution U4 of the recording medium, there occurs anew at instant t10 for a time interval from t11 a disk disturbance ST that leads to a settling behavior with a positive direction such that after a further revolution U5 and the renewed occurrence of the disk disturbance ST a negative follow-up signal A2 is coupled into the control loop and, as illustrated in FIG. 8, leads for a prescribed time interval to the reduction of the offset A1 used for the adjusted control loop. The duration for one revolution of the disk was used here as prescribed time interval in order to avoid frequent and large variations in the follow-up signal A2, as shown by a comparison with the exemplary embodiment illustrated in FIG. 10, in which case approximately twice the duration of the disk disturbance is used as time interval. On the other hand, the duration in which the settling amplitude exceeds a prescribed value can also be used as criterion for the duration of the coupling of the follow-up signal A2.

The exemplary embodiment illustrated in FIG. 10, in the case of which a shortened offset variation is used in the control loop is provided in order, for example, to compensate individually a plurality of individual disturbances ST during one revolution of the disk. The exemplary embodiment illustrated with the aid of one disturbance ST per revolution in FIG. 10 is, with regard to its effect on the error signals FE and TE illustrated in FIG. 9, virtually identical with the design illustrated in FIGS. 7 and 8 since, as has been established, a slight variation in the offset exerts a large influence on the settling behavior after a disturbance ST and, on the other hand, influences the control in the remaining region only imperceptibly.

In accordance with a further design as illustrated in FIG. 12, it is provided to insert the follow-up signal A2 into the control loop as early as when the settling amplitude ESA exceeds a prescribed threshold value. The renewed occurrence of the disturbance ST after one revolution of the disk is not awaited in accordance with this design, and a start is made immediately on coupling in the follow-up signal A2 when the settling amplitude ESA exceeds a prescribed threshold value. Consequently, the first occurrence of a settling amplitude ESA that exceeds a prescribed threshold value is already damped, and deviations of the scanning beam L from the track of the recording medium are reduced. The cycles illustrated in FIGS. 4 and 5 can be applied to this design with the difference that the follow-up signal A2 is coupled into the control loop immediately after the detection of the direction and after the settling amplitude ESA has exceeded a prescribed threshold value. The diamond symbolizing one or more revolutions nU in FIGS. 4 and 5 is to be displaced for this purpose into the feedback of the flowchart. This design is advantageous whenever the follow-up signal A2 can be inserted into the control loop directly as the threshold value is exceeded, since a delay may lead to an intensified deflection in the opposite direction. Should it not be possible to ensure the immediate coupling in of the follow-up signal A2 as a threshold value is exceeded, it is provided to couple the follow-up signal A2 into the control loop directly after the decay of the settling signal. In principle, the follow-up signal A2 is increased by one or more step widths X up to a prescribed maximum value when the disturbance ST occurs anew after approximately one revolution U and the direction of the settling amplitude ESA does not vary. In the case of a phase change or a change in the direction of the settling amplitude ESA, the follow-up signal A2 is reduced by a step width X when the disturbance ST occurs anew after approximately one revolution. The change in direction of the settling amplitude ESA, or the phase change signals that an optimum offset that compensates the scanning disturbance as far as possible has been set in the control loop. If the disturbance ST does not occur after approximately one revolution, the follow-up signal A2 is switched off, or reduced in a stepwise fashion in the case of large follow-up signal values A2. It is provided, moreover, to couple the follow-up signal A2 into the control loop for at least one revolution of the disk or as a function of the duration of the disturbance ST or of the exceeding of the threshold value for the settling amplitude. The follow-up signal A2 is coupled as offset into a control loop or into a plurality of control loops of the playback or recording unit. The exemplary embodiments for control loops that operate using the difference principle. However, the application of the invention is not limited to such control loops, since the follow-up signal A2 can also be applied with the same effect for control loops whose control signal is formed using other methods such as, for example, the phase detection method.

The proposed solutions compensate scanning disturbances on optical recording media after a disk disturbance ST increases the scannability of the playback or recording units in the event of defects on the optical recording media, and reduces data losses.

The embodiments described here are specified as examples, and a person skilled in the art can implement other embodiments of the invention that remain in the field of the invention.

What is claimed is:

1. A method for compensating scanning disturbances on optical recording media such as occur in a control loop of a playback or recording unit, in particular as settling amplitude after a disk disturbance, wherein a follow-up signal counteracting the settling amplitude is coupled into the control loop as additional offset as a function of the frequency of the occurrence of a disk disturbance for a prescribed time interval for the purpose of compensating scanning disturbances and that in the case of a settling amplitude that occurs anew in the same direction after approximately one revolution of the optical recording medium, the follow-up signal is increased by at least one step width, and is reduced by at least one step width in the case of a change in direction of the settling amplitude.

2. The method as claimed in claim 1, wherein the step width is the smallest unit by which an offset (A1) in the control loop can be varied.

3. The method as claimed in claim 1, wherein the step width of the follow-up signal is 10 mV, and is varied in a fashion that is linearly or nonlinearly rising or falling.

4. The method as claimed in claim 1, wherein the prescribed time interval for which the follow-up signal counteracting the settling amplitude is coupled into the control loop corresponds to the duration of one revolution of the optical recording medium.

5. The method as claimed in claim 1, wherein the prescribed time interval for which the follow-up signal counteracting the settling amplitude is coupled into the control loop corresponds at least to the length of duration of the disk disturbance or the time interval for which the settling amplitude exceeds a prescribed threshold value.

6. The method as claimed in claim 1, wherein the follow-up signal is inserted into the control loop after the disk disturbance, as early as during the disk disturbance and in a fashion transgressing the disk disturbance.

7. The method as claimed in claim 1, wherein the follow-up signal has an amplitude and direction that leads the scanning beam of the optical recording medium in the forward direction of a data track to be scanned after the disk disturbance.

8. A method for compensating scanning disturbances on optical recording media such as occur in a control loop of a playback or recording unit, in particular as settling amplitude after a disk disturbance, wherein a follow-up signal counteracting the settling amplitude is coupled into the control loop as additional offset as a function of the frequency of the occurrence of a disk disturbance for a prescribed time interval for the purpose of compensating scanning disturbances and wherein the step width of the follow-up signal has a value of approximately 10 per cent of the amplitude of the settling amplitude.

9. A method for compensating scanning disturbances on optical recording media such as occur in a control loop of a playback or recording unit, in particular as settling amplitude after a disk disturbance, wherein a follow-up signal counteracting the settling amplitude is coupled into the control loop as additional offset as a function of the frequency of the occurrence of a disk disturbance for a prescribed time interval for the purpose of compensating scanning disturbances and wherein the follow-up signal is produced in stepwise fashion for follow-up signal values in the event of absence of the disk disturbance after at least one revolution.

10. A method for compensating scanning disturbances on optical recording media such as occur in a control loop of a playback or recording unit, in particular as settling amplitude after a disk disturbance, wherein a follow-up signal counteracting the settling amplitude is coupled into the control loop as additional offset as a function of the frequency of the occurrence of a disk disturbance for a proscribed time interval for the purpose of compensating scanning disturbances and wherein in the event of a plurality of disk disturbances during one revolution of the optical recording medium only the settling behavior occurring with the greatest settling amplitude is evaluated and used to form the follow-up signal.

11. A method for compensating scanning disturbances on optical recording media such as occur in a control loop of a playback or recording unit, in particular as settling amplitude after a disk disturbance, wherein a follow-up signal counteracting the settling amplitude is coupled into the control loop as additional offset as a function of the frequency of the occurrence of a disk disturbance for a prescribed time interval for the purpose of compensating scanning disturbances and wherein the method is used for follow-up control of balance trimming.

* * * * *